US012677130B2

(12) United States Patent
Dutta et al.

(10) Patent No.: US 12,677,130 B2
(45) Date of Patent: Jul. 7, 2026

(54) SYSTEM AND METHOD FOR ENABLING A SIM CARD AS A MICRO-PLATFORM

(71) Applicant: JIO PLATFORMS LIMITED, Ahmedabad (IN)

(72) Inventors: Debashis Dutta, Navi Mumbai (IN); Chandan Maity, Navi Mumbai (IN); Shivraj Dagadi, Bangalore (IN); Anish Shah, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 646 days.

(21) Appl. No.: 18/043,054

(22) PCT Filed: Aug. 31, 2021

(86) PCT No.: PCT/IB2021/057964
§ 371 (c)(1),
(2) Date: Feb. 27, 2023

(87) PCT Pub. No.: WO2022/043967
PCT Pub. Date: Mar. 3, 2022

(65) Prior Publication Data
US 2023/0328505 A1 Oct. 12, 2023

(30) Foreign Application Priority Data
Aug. 31, 2020 (IN) .............................. 202021037527

(51) Int. Cl.
*H04W 8/18* (2009.01)
*H04W 4/50* (2018.01)

(52) U.S. Cl.
CPC ............... *H04W 8/18* (2013.01); *H04W 4/50* (2018.02)

(58) Field of Classification Search
CPC ......... H04W 8/18; H04W 4/50; H04W 12/35; H04W 12/40; G06F 11/3688
See application file for complete search history.

(56) References Cited

U.S. PATENT DOCUMENTS

| | | | |
|---|---|---|---|
| 6,216,014 B1 * | 4/2001 | Proust ..................... | G07F 7/082 235/382 |
| 2016/0360352 A1 * | 12/2016 | Khan ....................... | H04W 4/80 |
| 2017/0242784 A1 * | 8/2017 | Heorhiadi ........... | G06F 11/3684 |

FOREIGN PATENT DOCUMENTS

| | | |
|---|---|---|
| CN | 111274211 A | 6/2020 |
| GB | 2370659 A | 7/2002 |
| WO | 2013056104 A1 | 4/2013 |

OTHER PUBLICATIONS

Iso/iec: "ISO/IEC 7816-4 Identification cards ? Integrated circuit cards ? Part 4: Organization, security and commands for interchange", Jan. 15, 2005 (Jan. 15, 2005), XP055509201, Retrieved from the Internet: URL:http://www.embedx.com/pdfs/ISO_STD_7816/info_isoiec7816-4{ed21.0}en.pdf.

(Continued)

*Primary Examiner* — Christopher M Brandt
(74) *Attorney, Agent, or Firm* — FINNEGAN, HENDERSON, FARABOW, GARRETT & DUNNER, LLP

(57) ABSTRACT

A system and method for enabling a SIM card as a micro-platform for one or more third party micro-service applications. The method encompasses adding, a custom memory in the SIM card based on a telecom network operator's input. The method thereafter leads to partitioning, the custom memory into one or more custom-DFs, wherein the one or more custom-DFs are provided with an operating system support. Further the method encompasses assigning, an Application ID (AID) to each custom-DF. Also, the method encompasses assigning, an Application Program Interface (Continued)

(API) to each custom-DF to enable provision of the one or more third party micro-service applications in said each custom-DF. The method further comprises enabling, the SIM card as the micro-platform for the one or more third party micro-service applications based on the Application ID (AID) assigned to said each custom-DF and the Application Program Interface (API) assigned to said each custom-DF.

19 Claims, 9 Drawing Sheets

(56) References Cited

OTHER PUBLICATIONS

PCT International Search Report from International Appl. No. PCT/IB2021/05794, mailed Jan. 27, 2022.

* cited by examiner

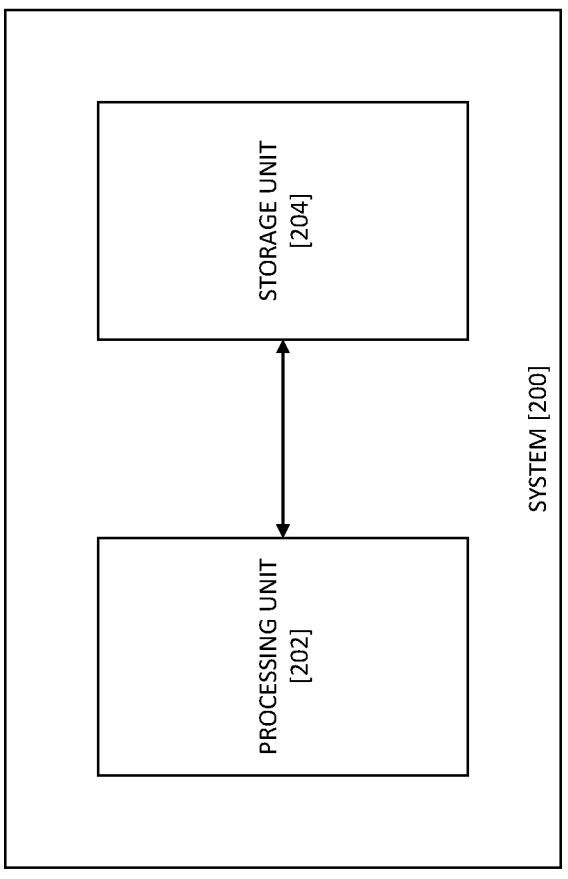
FIGURE 2

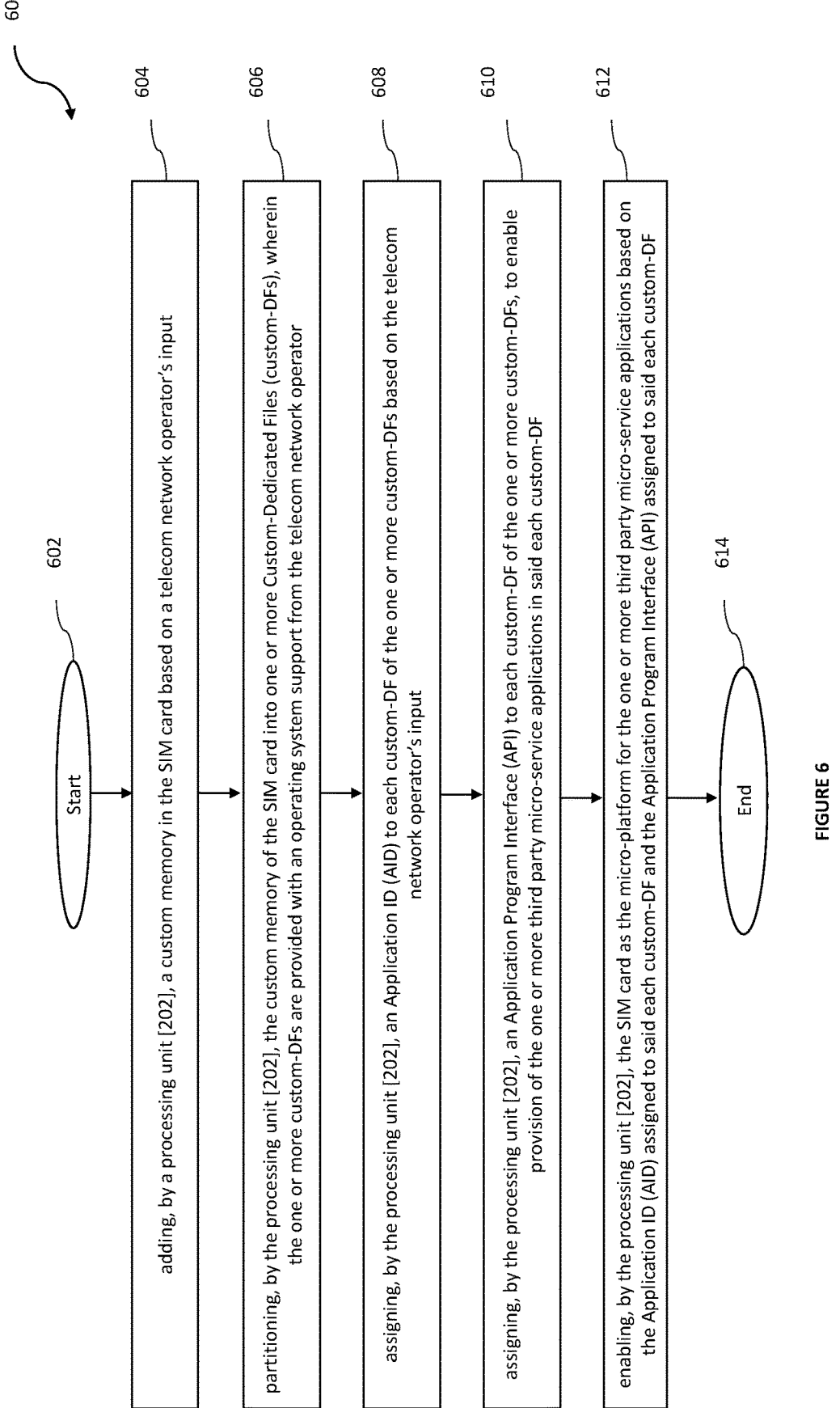

600

602 Start 604 adding, by a processing unit [202], a custom memory in the SIM card based on a telecom network operator's input 606 partitioning, by the processing unit [202], the custom memory of the SIM card into one or more Custom-Dedicated Files (custom-DFs), wherein the one or more custom-DFs are provided with an operating system support from the telecom network operator 608 assigning, by the processing unit [202], an Application ID (AID) to each custom-DF of the one or more custom-DFs based on the telecom network operator's input 610 assigning, by the processing unit [202], an Application Program Interface (API) to each custom-DF of the one or more custom-DFs, to enable provision of the one or more third party micro-service applications in said each custom-DF 612 enabling, by the processing unit [202], the SIM card as the micro-platform for the one or more third party micro-service applications based on the Application ID (AID) assigned to said each custom-DF and the Application Program Interface (API) assigned to said each custom-DF 614 End

FIGURE 6

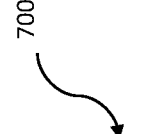
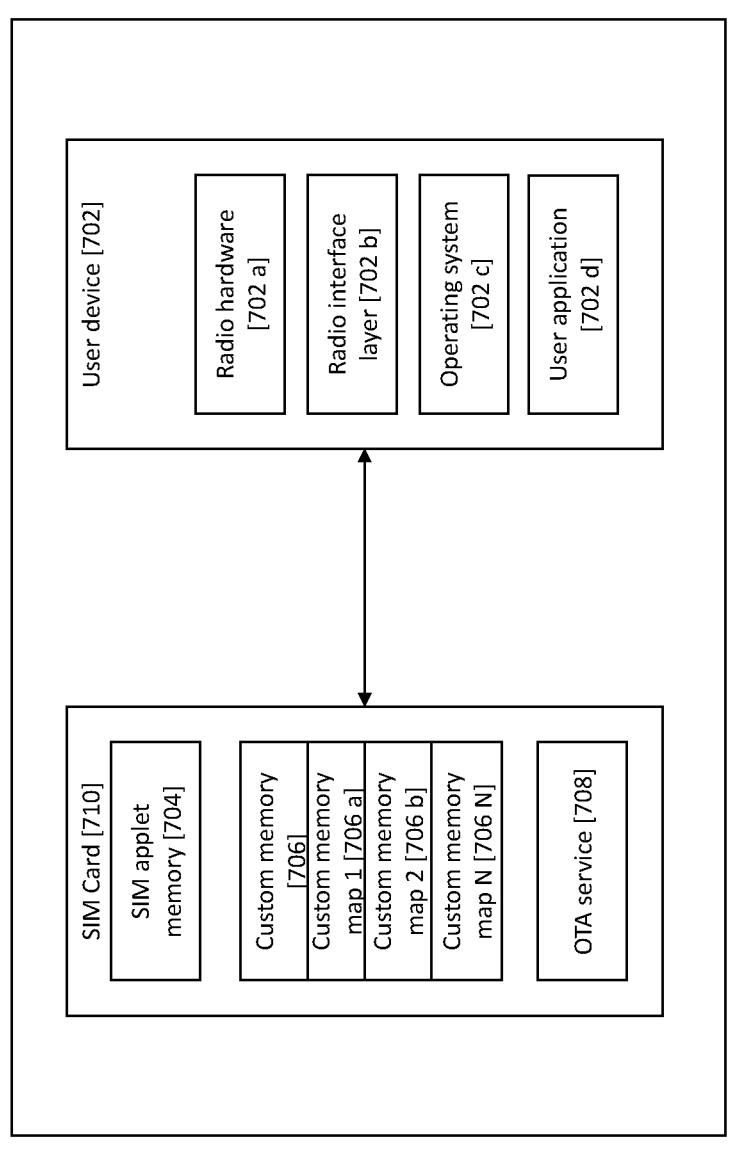
FIGURE 7

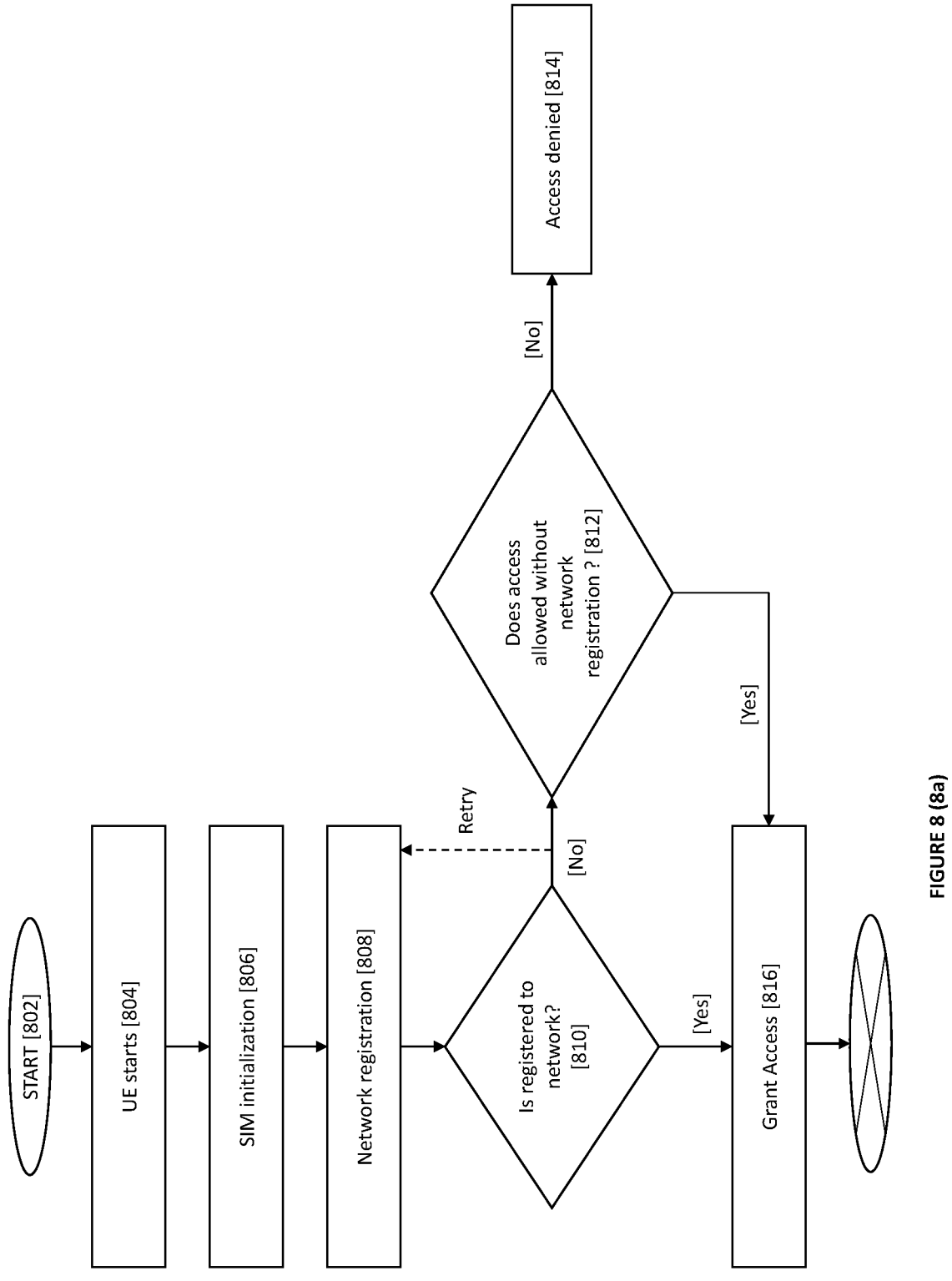
FIGURE 8 (8a)

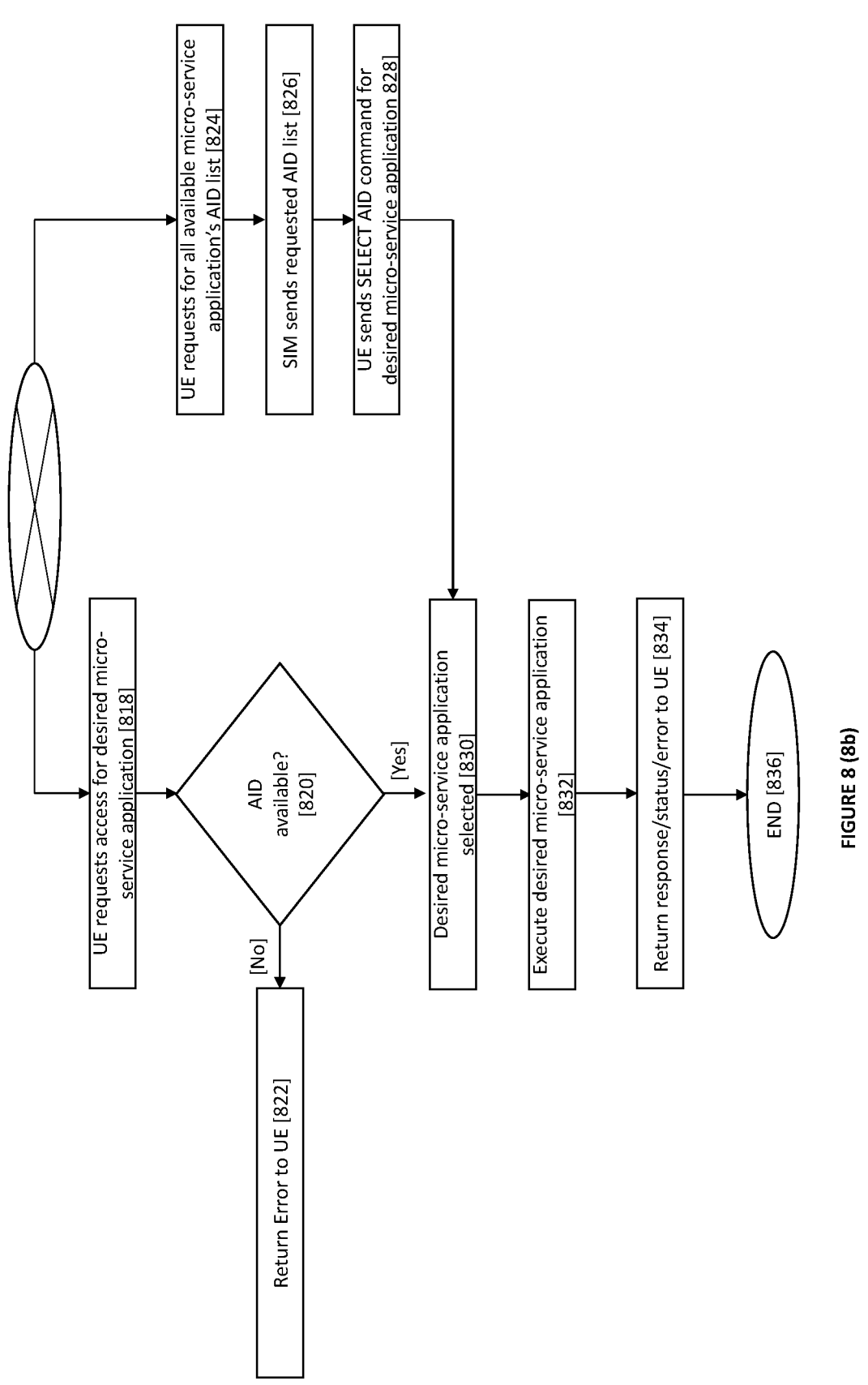
FIGURE 8 (8b)

SYSTEM AND METHOD FOR ENABLING A SIM CARD AS A MICRO-PLATFORM

TECHNICAL FIELD

The present invention generally relates to subscriber identity module (SIM) ecosystem and more particular to a system and method for enabling a SIM card as a micro-platform for one or more third party micro-service applications.

BACKGROUND OF THE DISCLOSURE

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Wireless networks are widely deployed today to provide various communication services such as voice, video, data, advertisement, content, messaging, broadcasts, etc. The wireless networks usually comprise multiple access networks and support communications for multiple users by sharing the available network resources. An example of such a network is the Evolved Universal Terrestrial Radio Access (E-UTRA) which is a radio access network standard meant to be a replacement of the Universal Mobile Telecommunications System (UMTS) and High-Speed Downlink Packet Access/High-Speed Uplink Packet Access (HSDPA/HSUPA) technologies specified in 3GPP releases 5 and beyond. Unlike HSPA, Long Term Evolution's (LTE's) E-UTRA is an entirely new air interface system, unrelated to and incompatible with W-CDMA. It provides higher data rates, lower latency and is optimized for packet data. The earlier UMTS Terrestrial Radio Access Network (UTRAN) is the radio access network (RAN), defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. Furthermore, as the demand for mobile data and voice access continues to increase, research and development continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increase in data speeds, and spectral efficiency, and allowing the provision of more functionality.

The wireless communication networks also include 5th generation mobile networks or 5th generation wireless systems, abbreviated 5G, the telecommunications standards beyond the current 4G LTE/international mobile telecommunications (IMT)-advanced standards. 5G aims at higher capacity than current 4G LTE, allowing a higher density of mobile broadband users, and supporting device-to-device, ultra-reliable, and massive machine communications. 5G also aims at lower latency than 4G equipment and lower battery consumption, for better implementation of the Internet of things (IoT) devices. 3GPP has also introduced Narrow Band Internet of things IoT (NB-IoT) technology in release 13. The low end IoT applications can be met with this technology. It has taken efforts to address IoT markets with completion of standardization on NB-1° T. The NB-IoT technology has been implemented in licensed bands. The licensed bands of LTE are used for exploiting this technology. This technology makes use of a minimum system bandwidth of 180 KHz i.e. one PRB (Physical Resource Block) is allocated for this technology. The NB-IOT can be seen as a separate RAT (Radio Access Technology). The NB-IOT can be deployed in 3 modes as: "in-band", "guard band" and "standalone". In the "in-band" operation, resource blocks present within LTE carrier are used. There are specific resource blocks reserved for synchronization of LTE signals which are not used for NB-IOT. In "guard band" operation, resource blocks between LTE carriers that are not utilized by any operator are used. In "standalone" operation, GSM frequencies are used, or possibly unused LTE bands are used. Release 13 contains important refinements like discontinuous reception (eDRX) and power save mode. The PSM (Power Save Mode) ensures battery longevity in release 12 and is completed by eDRX for devices that need to receive data more frequently.

Furthermore, the Internet of Things (IoT) is a network of devices, vehicles, home appliances, and other items embedded with electronics, software, sensors, actuators, and connectivity which can be readable, recognizable, locatable, addressable, and controllable via an IoT communications network that enables these things to connect and exchange data, creating opportunities for more direct integration of the physical world into computer-based systems, resulting in efficiency improvements, economic benefits, and reduced human exertions. The "Internet of things" (IoT) concept getting more and more popular, devices, such as sensors, actuators and everyday objects including the coffee makers, washing machines, headphones, lamps and wearable devices, etc. are being increasingly looked upon as potential IoT devices. IoT involves extending internet connectivity beyond standard devices, such as desktops, laptops, smartphones and tablets, to any range of traditionally dumb or non-internet-enabled physical devices and everyday objects. Embedded with technology, these devices can communicate and interact over the communication networks, and they can be remotely monitored and controlled. The term "Enterprise IoT" refers to devices used in business and corporate settings in a network of physical objects that contain embedded technology to communicate and sense or interact with their internal states or the external environment. Here, IoT refers to connected physical devices, in many cases everyday objects (things) that can communicate their status, respond to events, or even act autonomously. This enables communication among those things, closing the gap between the real and the virtual world and creating smarter processes and structures that can support user without needing their attention. IoT has evolved from the convergence of wireless technologies, micro-electromechanical systems (MEMS), and the Internet. An IoT device is generally provisioned with an IP address to provide it with the capability of transferring data and receive control signals over an IP network using the standard Internet protocols such as TCP/IP or UDP which is being exclusively used in the Internet.

Furthermore, one or more smart devices/user devices via the above disclosed and the like communication technologies provides one or more communication services to users, wherein a 'smart computing device or user equipment (UE) or user device or smart device' refers to any electrical, electronic, electro-mechanical computing device or equipment or a combination of one or more of the above devices. Also, a 'smartphone' is one type of "smart computing device/user device" that refers to mobility wireless cellular connectivity device that allows end users to use services on 2G, 3G, 4G, 5G and/or the like mobile broadband Internet connections with an advanced mobile operating system which combines features of a personal computer operating system with other features useful for mobile or handheld use. The mobility wireless cellular connectivity device to allow the end users to use various services that are equipped with a SIM (subscriber identification module) card. For instance, FIG. 1 illustrates an exemplary block diagram [100] of a user equipment (Smartphone/feature-phone/any other communicating device) [110] for availing at least one service by the user equipment (UE) [110] using currently known solutions. FIG. 1 depicts that a subscriber identity module (SIM) [120] is configured inside the user equipment [110] for providing various functionalities. The user equipment [110] may further comprise a plurality of sub systems [102, 102A, 120B, 102C, 103, 104, 105 and 106], wherein said subsystems [102, 102A, 120B, 102C, 103, 104, 105 and 106] may include, but not limiting to, a modem subsystem [102] with a Baseband DSP processor [102C] and a plurality of radio interfaces [102A]. The user equipment [110] may further include a cellular radio [102B] transmission/reception radio frequency (RF) connected to the antenna [107] for receiving and transmitting wireless services such as VoIP and Internet/Intranet services. Also, the user equipment [110] may comprise an application processor [104], a memory subsystem [105], a power subsystem [106] and an external I/O interfaces subsystem [103]. The present disclosure further encompasses that the subscriber identity module [120] may comprise a processor [120B], an I/O interface [120A], a RAM temporary storage [120C], an EEPROM/ Non-volatile Memory (NVM) [120D] and a SIM file system [120E]. Further, the EEPROM/Non-Volatile Memory (NVM) [120D] may consist of an operating system code and a code of other SIM applications. The SIM file system [120E] and USIM application may contain elementary files and location parameters such as EFLOCI (Location Information), EFPSLOCI (PS Location Information), EFEPSLOCI (PS Location Information) and various other application specific files used by various SIM applications running on the subscriber identity module [120] along with a plurality of context.

Furthermore, a typical SIM (subscriber identification module) card ecosystem comprises of an integrated circuit chip that is intended to securely store an international mobile subscriber identity (IMSI) number and its related key, which are used to identify and authenticate subscribers/users on the mobile telephony devices equipped with the SIM card (such as mobility devices like the smartphones, tabs, laptops, computers, etc.). The SIM cards have been used in handsets (smart phones/feature phones/user devices) with GSM, CDMA, LTE and/or 5G/6G support including IoT devices. Also, today some of the user devices are available with e-SIM (i.e. an embedded SIM integrated and assembled inside such user devices). The functionality and operation of the SIM cards are driven by ETSI and 3GPP specifications. Furthermore, a SIM circuit is part of a function of a Universal Integrated Circuit Card (UICC) physical smart card, which is usually made of PVC with embedded contacts and semiconductors. Furthermore, the UICC (Universal Integrated Circuit Card) can have multiple applications like SIM (2G), USIM (3G/4G), ISIM (IMS), etc. The UICC is simply referred to as 'SIM' or 'SIM card' herein. After SIM activation on UE boot up, the UE selects application(s) in the SIM, for example, USIM for 4G LTE. Generally, the SIM cards are designed to be transferable between different mobile/IoT devices. Furthermore, the mobile SIM cards or embedded-SIM modules are independent and separate hardware. These SIMs have their own processing and storage capability. The SIM hardware module is isolated from a main RF and application processor of any UE. Inter alia, these interact with each other as defined in ISO-7816 standard. Further, these distinct kinds of communication can be primarily classified as command-response type. Some of the command-response are defined and specific (as per ETSI GSM and 3GPP specifications) whereas others as admissible are custom or telecom service operator specific. An internal memory map and state-machine of a SIM card also have a specific flow with provision to add or customized operator specific application/applet. Using the privilege of custom application/applet, the SIM cards are available with remote firmware upgrade support via OTA (Over the Air) server. However, in practical scenario, SIM applets' upgradations are not very dynamic in nature and are only needed occasionally.

Also, each SIM card contains its unique serial number (ICCID), international mobile subscriber identity (IMSI) number, security authentication and ciphering information, temporary information related to a local network, a list of services a user of said SIM has access to, and passwords like: a personal identification number (PIN) for ordinary use, a personal unblocking code (PUK) for PIN unlocking, etc. The SIM file system consists of the Master File (MF), Dedicated Files (DFs) and the Elementary Files (EFs). The MF is a unique mandatory file containing access conditions and other DFs and EFs. The DFs contain access conditions and optionally other DFs and EFs. The EFs contain access conditions of data contained in them, but EFs don't contain any additional files. A typical USIM application may have many Elementary Files (EFs) and/or Dedicated Files (DFs). These files are used for controlling the UE's behaviour in a network, helping the UE to securely register to a desired network, enabling and restricting certain services, maintaining status lists and parameters, etc. Furthermore, every network operator has a unique Public Land Mobile Network (PLMN) number. PLMN consists of the Mobile Country Code (MCC) and Mobile Network Code (MNC). Every subscriber/user of service provider operator is identified by a unique International Mobile Subscriber Identity (IMSI) which consists of the PLMN (MCC, MNC) of the service provider operator and the Mobile Subscription Identification Number (MSIN). The PLMN contained in the subscriber's IMSI is called Home PLMN (HPLMN) and a corresponding network is referred to as Home Network (HN) herein. When a subscriber of a service provider operator tries to attach to another network operator due to various reasons like unavailability of home network, etc. it is identified as a Roaming Subscriber (RS) and that network operator is referred to as Roamed Network (RN) herein. The roaming subscriber can access the roamed network services as per bilateral roaming agreements between the home and the roamed network operators.

Furthermore, beyond network and data services, the network service operators hold control and ownership of the SIM (Subscriber's Identity Module) cards. In current system, in-spite of having capability, the SIM cards are not being used to expand their scope of utility. The current systems fails to enable and enhance a capacity (processing speed and memory) of the SIM cards which can create a completely new domain where a SIM memory space may be offered as a service to various business entities to port their application(s), where such application(s) may relate to a secure communication, storage of sensitive data (such as biometric or password or keys), or secure processing. Furthermore, apart from mandatory functionalities, there is enough scope/provision for the network service operators to use resources inside the SIM cards to provide additional functionalities for various value-added services, however, except certain limited addition (such as SIM toolkit services), the network service operators failed to expanded the scope and utility of the SIM cards. More specifically, the currently known solutions fails to provide a logical and access partition in a SIM memory of the SIM cards to accommodate independent micro-application(s) or applet(s). At present beyond a SIM memory that is provided, there is no way to customize and partition said SIM memory for various service providers or third-party applications. Also, till date, for application(s) that are running as a background process on a UE, there is no mechanism to run such applications in a complete back-ground even at sleep-mode. Main CPU of the UE always needs to be awaked to run the application(s) which is too much power hungry. Also, the SIM card and the radio module are always active in the UE even when the UE is in a sleep mode or in low power mode, so that they can perform certain tasks without interrupting OS of the UE to wake up in many cases. The currently known solutions fails to use the capability of the SIM card to provide enhanced communication security feature(s) from the user equipment (UE) or embedded device to backend server/cloud/system, without interfering operating system (OS) or the application(s) of the UE. Also, most of the UE or smart-phone are not having secure memory to store sensitive data. The secure memory-based module (hardware secure-element enabled UE) are costly. The currently known solutions fails to enable the SIM cards to provide a secure area for secure operation(s). Also, the currently known solutions fails to provide parallel processing utilizing a SIM hardware to enhance a processing capability. Furthermore, the currently known solutions also fails to provide various third party services using a processing unit and memory space of the SIM cards, because of various reasons viz. i) no significant technology inclusion/development for value added services leveraging a SIM capability, ii) application(s) and repository are driven by mobile OS provider, but not by the SIM cards iii) a need of secure memory, micro-applications not felt and iv) parallel processing, power consumptions may not be the primary requirements etc.

Hence, there is a need in the art to provide a novel solution for logical and access partition in a SIM memory, running secured applications on a SIM itself without waking a UE's OS, partitioning a SIM memory to store secured application(s) with secured element(s) and also providing SIM as a service with parallel processing. Therefore, there is a need for a novel system and method for enabling a SIM card as a micro-platform.

The foregoing examples of the related art and limitations related therewith are intended to be illustrative and not exclusive. Other limitations of the related art will become apparent to those of skill in the art upon a reading of the specification and a study of the figures.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide a system and method for enabling a SIM card as a micro-platform for one or more third party micro-service applications. Another object of the present invention is to provide a new technique of logical and access partition in a SIM memory to accommodate independent micro-application(s) or applet(s). Also an object of the present invention is to provide a robust solution for a secure area in a SIM card which can be exploited for secured operations. Another object of the present invention is to provide mechanism that allow third party access, provisioning and business model over independent applet(s) as services on a SIM card itself. Further, an object of the present invention is to provide a seamless and secured user experience on a SIM card without any deterrence. Another object of the present invention is to provide a solution that connects billions of user devices with proposed way of achieving services/application functionalities, security and privacy aspects in UEs including IoTs and machine to machine (M2M) communications. Also, an object of the present invention is to provide a solution that has a lighter memory footprint as well as processing requirements. Further, an object of the present invention is to create B2B service on boarding of other third-parties application(s) with inclusion of value-added services inside a SIM card. Also, an object of the present invention is to provide a solution for better security and privacy, need for secure data storing and processing in coming days and creating a fundamental bench mark and platform to accommodate such updates. Further, an object of the present invention is to help in reducing a probability of failure in providing service to subscribers with new secured applications. Another object of the present invention is to provide solution that can upgrade current dumb devices with capability of a SIM as service to person presence and preference to provide better emotional voice command experiences. Yet another object of the present invention is to provide a mechanism for a seamless enhancement of the existing SIMs with new Services in the user devices independent and interoperable for devices and the IoT on 6G/5G/4G/3G/EV-Do/eHRPD capable technology.

In order to achieve the aforementioned objectives, the present invention provides a method and system for enabling a SIM card as a micro-platform for one or more third party micro-service applications.

An aspect of the present invention relates to a method for enabling a SIM card as a micro-platform for one or more third party micro-service applications. The method encompasses adding, by a processing unit, a custom memory in the SIM card based on a telecom network operator's input. The method thereafter leads to partitioning, by the processing unit, the custom memory of the SIM card into one or more Custom-Dedicated Files (custom-DFs), wherein the one or more custom-DFs are provided with an operating system support from the telecom network operator. Further the method encompasses assigning, by the processing unit, an Application ID (AID) to each custom-DF of the one or more custom-DFs based on the telecom network operator's input. Also, the method encompasses assigning, by the processing unit, an Application Program Interface (API) to each custom-DF of the one or more custom-DFs, to enable provision of the one or more third party micro-service applications in said each custom-DF. The method further comprises enabling, by the processing unit, the SIM card as the micro-platform for the one or more third party micro-service applications based on the Application ID (AID) assigned to said each custom-DF and the Application Program Interface (API) assigned to said each custom-DF.

Another aspect of the present invention relates to a method of uploading to a Micro-application Temporary Repository, one or more third party micro-service applications, one or more test-cases related to the one or more third party micro-service applications and corresponding results of the one or more test-cases. The method encompasses receiving, at the compliance server from a third party server, the one or more third party micro-service applications, the one or more test-cases related to the one or more third party micro-service applications and the corresponding results of the one or more test-cases. The method thereafter comprises uploading, by the compliance server to the Micro-application Temporary Repository of the compliance server, the received one or more third party micro-service applications, one or more test-cases related to the one or more third party micro-service applications and the corresponding results of the one or more test-cases.

Another aspect of the present invention relates to a system for enabling a SIM card as a micro-platform for one or more third party micro-service applications. The system comprises a processing unit configured to add, a custom memory in the SIM card based on a telecom network operator's input. The processing unit is thereafter configured to partition, the custom memory of the SIM card into one or more Custom-Dedicated Files (custom-DFs), wherein the one or more custom-DFs are provided with an operating system support from the telecom network operator. Also, the processing unit is configured to assign, an Application ID (AID) to each custom-DF of the one or more custom-DFs based on the telecom network operator's input. The processing unit is also configured to assign, an Application Program Interface (API) to each custom-DF of the one or more custom-DFs, to enable provision of the one or more third party micro-service applications in said each custom-DF. Further the processing unit is configured to enable, the SIM card as the micro-platform for the one or more third party micro-service applications based on the Application ID (AID) assigned to said each custom-DF and the Application Program Interface (API) assigned to said each custom-DF.

Another aspect of the present invention relates to a system of compliance server for uploading to a Micro-application Temporary Repository, one or more third party micro-service applications, one or more test-cases related to the one or more third party micro-service applications and corresponding results of the one or more test-cases. The compliance server is configured to receive from a third party server, the one or more third party micro-service applications, the one or more test-cases related to the one or more third party micro-service applications and the corresponding results of the one or more test-cases. Further the compliance server is configured to upload, to the Micro-application Temporary Repository of the compliance server, the received one or more third party micro-service applications, one or more test-cases related to the one or more third party micro-service applications and the corresponding results of the one or more test-cases.

Yet another aspect of the present invention relates to a SIM card provided as a micro-platform for one or more third party micro-service applications, wherein the SIM card comprises at least a pre-assigned memory segment and a custom memory segment. The pre-assigned memory segment is a memory segment defined as per specific guidelines/regulations and the pre-assigned memory segment is assigned for GSM and/or Telecom applet(s). The custom memory segment is an additional memory segment and is configured to store a data related to one or more third party micro-service applications.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 2 illustrates an exemplary block diagram of a system [200] for enabling a SIM card as a micro-platform for one or more third party micro-service applications, in accordance with exemplary embodiments of the present invention.

FIG. 6 illustrates an exemplary flow diagram of a method [600] for enabling a SIM card as a micro-platform for one or more third party micro-service applications, in accordance with exemplary embodiments of the present invention.

FIG. 7 illustrates an exemplary proposed memory map of a SIM card installed in a user device, in accordance with exemplary embodiments of the present invention.

FIGS. 8 (8*a* and 8*b*) illustrates an exemplary interaction between a UE and a SIM card, in accordance with exemplary embodiments of the present invention.

Figure 1:
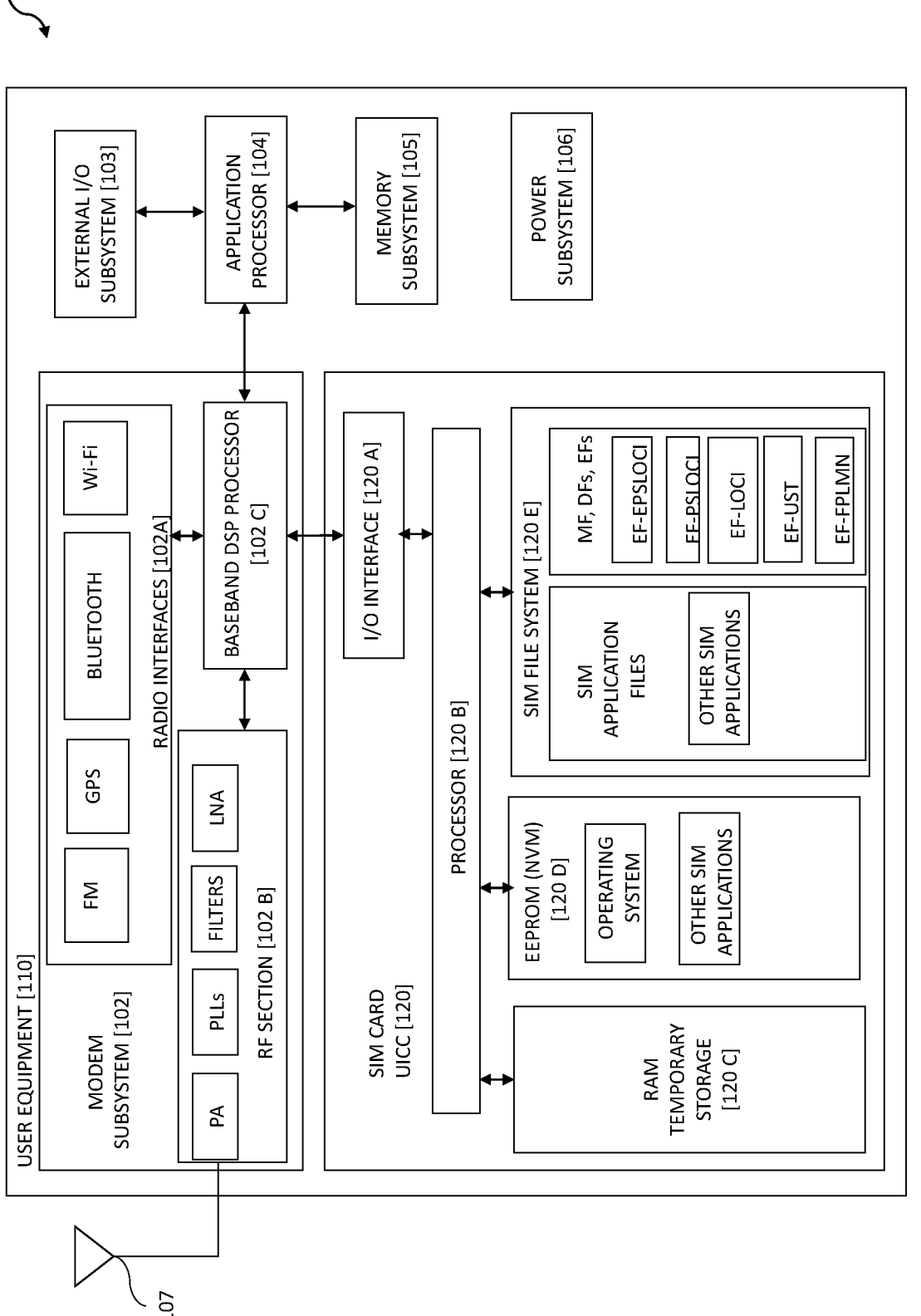
FIG. 1 illustrates an exemplary block diagram [100] of a user equipment [110] for availing at least one service by the user equipment (UE) [110] using currently known solutions.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only some of the problems discussed above.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, audio/video, text, images, animations, databases, broadcasts, displays (including but not limited to video displays, posters and billboards), signs, signals, web pages, print media and streaming media data.

The terms "reading" and "read" as used herein mean a process or processes that serve to recover data that has been added to, encoded in, combined with or embedded in, media data.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

The terms "first", "second", "primary" and "secondary" are used to distinguish one element, set, data, object, step, process, function, activity or thing from another, and are not used to designate relative position, or arrangement in time or relative importance, unless otherwise stated explicitly. The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/ or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," and "communicating" and as used herein include both conveying data from a source to a destination, and delivering data to a communications medium, system, channel, network, device, wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

Moreover, terms like "user equipment" (UE), "electronic device", "mobile station", "user device", "mobile subscriber station," "access terminal," "terminal," "smartphone," "smart computing device," "handset," and similar terminology refers to any electrical, electronic, electro-mechanical equipment or a combination of one or more of the above devices. Smart computing devices may include, but not limited to, a mobile phone, smart phone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user configured, computer networked device that can operate autonomously. A smart computing device is one of the appropriate systems for storing data and other private/ sensitive information. The said device operates at all the seven levels of ISO reference model, but the primary function is related to the application layer along with the network, session and presentation layer with any additional features of a touch screen, apps ecosystem, physical and biometric security, etc. Further, a 'smartphone' is one type of "smart computing device" that refers to the mobility wireless cellular connectivity device that allows end-users to use services on 2G, 3G, 4G, 5G and the like mobile broadband Internet connections with an advanced mobile operating system which combines features of a personal computer operating system with other features useful for mobile or handheld use. These smartphones can access the Internet, have a touchscreen user interface, can run third-party apps including the capability of hosting online applications, music players and are camera phones possessing high-speed mobile broadband 4G LTE internet with video calling, hotspot functionality, motion sensors, mobile payment mechanisms and enhanced security features with alarm and alert in emergencies. Also, the smartphone here included may have the voice trigger capability either as native or OTT application. Mobility devices may include smartphones, wearable devices, smart-watches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT devices enable the communication on the devices. Furthermore, the foregoing terms are utilized interchangeably in the subject specification and related drawings.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. Furthermore, the term "processor" as used herein includes, but is not limited to one or more computers, hardwired circuits, signal modifying devices and systems, devices and machines for controlling systems, central processing units, programmable devices and systems, systems on a chip, systems comprised of discrete elements and/or circuits, state machines, virtual machines, data processors, processing facilities and combinations of any of the foregoing. The processor may perform signal coding data processing, input/output processing, and/ or any other functionality that enables the working of the system according to the present disclosure. More specifically, the processor or processing unit is a hardware processor. The term "processor" as used herein means processing devices, apparatus, programs, circuits, components, systems and subsystems, whether implemented in hardware, tangibly-embodied software or both, and whether or not programmable.

As used herein, "memory unit", "storage unit", "storage" and "data storage" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The memory unit as used herein is configured to retain data, whether on a temporary or permanent basis, and to provide such retained data to various units to perform their respective functions.

As disclosed in the background section, the existing technologies have many limitations and in order to overcome at least some of the limitations of the prior known solutions, the present disclosure provides a solution for enabling a subscriber identity module (SIM) card as a micro-platform to provision one or more third party microservice applications in the SIM card. More particularly, the present invention provides a solution that enables a SIM card installed in a user device as an extra secure hardware module which may be used as a platform/micro-platform where any other third-party (micro-application or service developer) can port its micro-application(s)/secure parameter(s) to perform certain tasks without exposing those micro-application(s)/secure parameter(s) to the user device's operating system (OS) and/or to a user memory area in the user device which is not very secure.

Furthermore, the present invention in order to enable the subscriber identity module (SIM) card as the micro-platform for the one or more third-party micro-service applications encompasses adding a custom memory in the SIM card based on a telecom network operator's input, wherein the custom memory is added in addition to memory blocks/sub-blocks that are mandatory as per GSM specification. Further once the custom memory is added, a partition of such custom memory is done and one or more Custom-Dedicated Files (custom-DFs) are defined based on such partition. Each Custom-Dedicated File of the one or more Custom-Dedicated Files is assigned with a designated application ID (AID) and said each custom DF resides in the added custom memory (i.e. in extra memory space apart from memory space assigned for GSM or Telecom applet(s)). Also, each custom-dedicated file contains a complete independent process flow with its own state diagram. The process includes its logical operation as well as memory operation for storage of various internal and external (to user) data. Also, each custom-dedicated file is provided with an operating system support from the telecom network operator. Furthermore, an Application Program Interface (API) is also assigned to each custom-DF to enable provision of the one or more third party micro-service applications in said each custom-DF. Therefore, based on at least these implementations the SIM card is enabled as a micro-platform for the one or more third-party micro-service applications and the one or more third-party micro-service applications may be loaded in the one or more custom-DFs based on the implementation of the features of the present invention.

Also, the present invention encompasses loading of the one or more third party micro-service applications in the one or more custom-DFs based on an approval and loading process. More particularly, once the one or more third party micro-applications are ready, the third party or client needs to submit said one or more third party micro-applications through a defined process (i.e. the approval and loading process) to the telecom network operator. The approval and loading process includes a complete compliance testing and validation process for the approval of the one or more third party micro-service applets/applications, by the telecom network operator. The one or more third party micro-service applets/applications are loaded to the one or more custom-DFs based on a successful compliance testing and a successful validation process.

Furthermore, the present invention also provides a solution of selection and execution of the one or more third party micro-service applications at the user device. More particularly, a desired third party micro-service application from the one or more third party micro-service applications loaded in the one or more custom-DFs of the SIM card may be selected at the user device based on a "SELECT" AID command/query for said desired third party micro-service application. Once the desired micro-service application is selected by the user device, one or more processes such as a Finite Process, an Infinite Process, a Pause/Resume Process etc. associated with such desired third party micro-service application may be executed at the user device.

The present disclosure therefore provides a novel solution that helps a service provider/telecom network operator to provide via a SIM card, value added services to users either by itself or through other third parties. Also, the present invention provides a novel solution for logical and access partition(s) in a SIM memory, running secured application(s) on the SIM itself without waking the user device/UE operating system (OS), partitioning a SIM memory to store secured application(s) with secured element(s) and also for providing the SIM as service with parallel processing etc. The present invention also provides a technical advancement over the currently known solutions by overcoming the limitation of prior known solutions related to at least one of: a failure of providing a logical and access partition in a SIM memory to accommodate independent micro-application(s) or applet(s), a failure of running secured applications on a SIM card itself without waking the user device/UE OS, a failure of using a capability of a SIM card to provide enhanced communication security feature(s), a failure of enabling a SIM card to provide a secure area for secure operation(s), a failure of providing parallel processing by utilizing a SIM hardware to enhance a processing capability etc.

Hereinafter, exemplary embodiments of the present disclosure will be described in detail with reference to the accompanying drawings so that those skilled in the art can easily carry out the present disclosure.

Referring to FIG. 2, an exemplary block diagram of a system [200] for enabling a SIM card as a micro-platform for one or more third party micro-service applications, in accordance with exemplary embodiments of the present invention is shown.

The system [200] comprises at least one processing unit [202] and at least one storage unit [204]. Also, all of the components/units of the system [200] are assumed to be connected to each other unless otherwise indicated below. Also, in FIG. 2 only a few units are shown, however, the system [200] may comprise multiple such units or the system [200] may comprise any such numbers of said units, as required to implement the features of the present disclosure. Further, in an implementation, the system [200] may be present in a subscriber identity module (SIM) card to implement the features of the present invention.

The system [200] is configured to enable a SIM card as a micro-platform for one or more third party micro-service applications, with the help of the interconnection between the components/units of the system [200].

Figure 3:
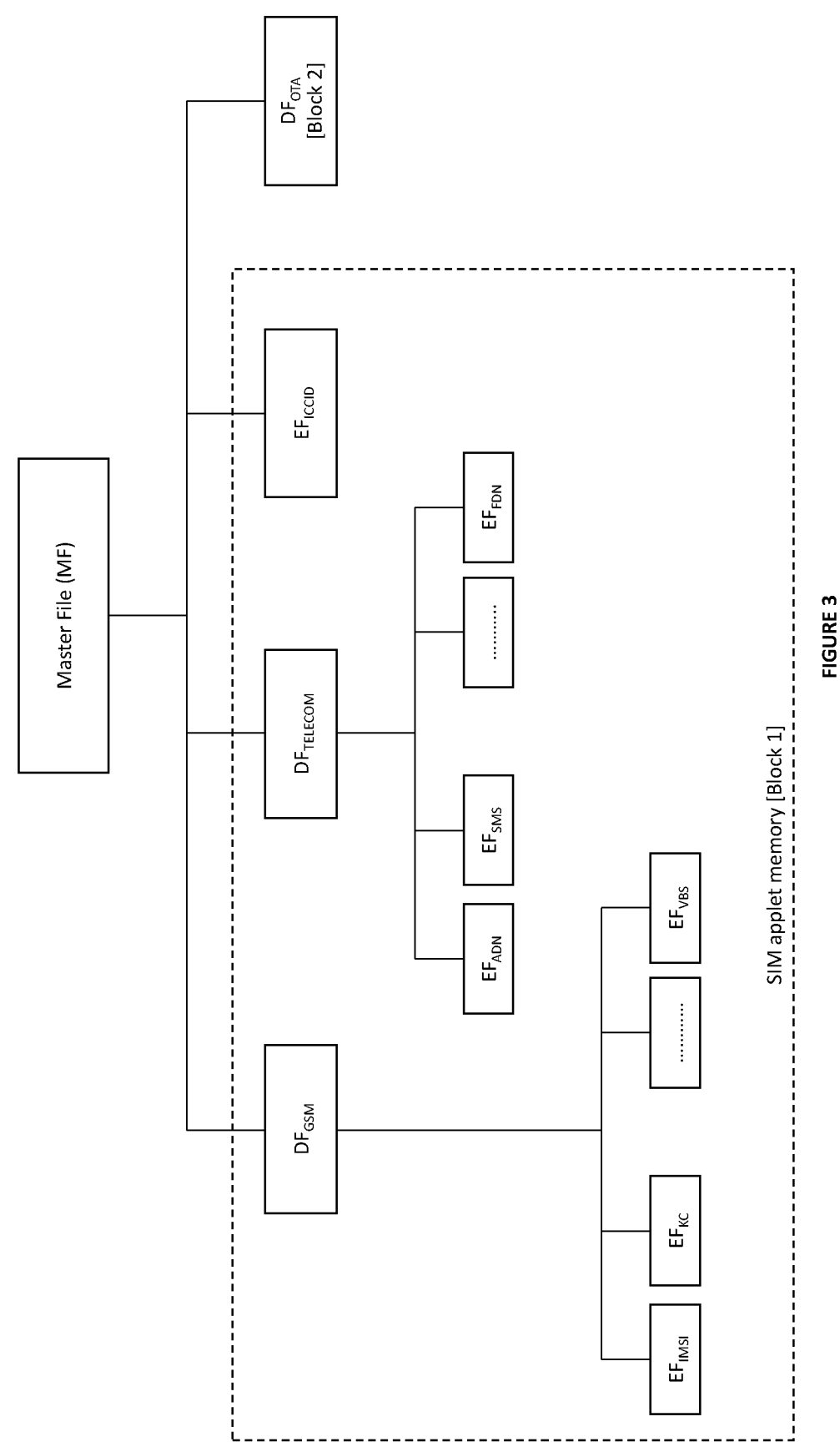
FIG. 3 illustrates an exemplary block diagram of a detailed file structure and a memory map present in an existing SIM card, adhering to a global standard.

The processing unit [202] of the system [200] is configured to add, a custom memory in the SIM card based on a telecom network operator's input, wherein the SIM card also comprises a pre-assigned memory. The pre-assigned memory is a memory segment as per specific guidelines/regulations and the pre-assigned memory is assigned for GSM and/or Telecom applet(s). The custom memory is added in the SIM card in addition to the memory block/segment governed by the standard (i.e. in addition to the pre-assigned memory), therefore the custom memory is an extra memory space apart from the memory space assigned for the GSM and/or Telecom applet(s). Furthermore, in FIG. 3 an exemplary block diagram of a detailed file structure and a memory map present in an existing SIM card, adhering to global standard (GSM 11.11, V 5.3.0, section-10.4) is shown. For SIM applet memory (block 1) as indicated in the FIG. 3, the scope/requirement needs to be as per specific guidelines/regulations, whereas other memory segments such DFOTA (block 2) are not governed by standard and may be designed as per discretion of the telecom network operator or a SIM card vendor. Also, the FIG. 3 depicts a pictorial representation of "memory segment" for non-OS/OS based SIM card, where a master file, various dedicated files and various elementary files are depicted. Usually to minimize price, no "unused" memory is provided in a traditional SIM card and all extra available memory (such as to store extra SMS and/or contact details) is incorporated and accessible inside the block 2 as indicated in the FIG. 3. Therefore, the processing unit [202] is configured to add the custom memory in the SIM card along with the block 1 and 2 as indicated in the FIG. 3, wherein the custom memory is added by the processing unit [202] based on the telecom network operator's input.

The processing unit [202] is also configured to partition, the custom memory of the SIM card into one or more Custom-Dedicated Files (custom-DFs), wherein the one or more custom-DFs are provided with an operating system support from the telecom network operator. In an implementation, the processing unit [202] is configured to partition the custom memory of the SIM card into the one or more custom-DFs based on at least one of one or more logical and one or more access partition techniques. Also, in another implementation, the processing unit [202] may be configured to partition the custom memory of the SIM card in the one or more Custom-Dedicated Files (custom-DFs) based on one or more available security domains. The one or more available security domains may be defined by a Global-Platform. The Global-Platform (GP) is an independent and non-profit organization that deals with smart card development and it's management. The Global-Platform (GP) has introduced a specific way of managing the security of each application within the SIM card. This way it ensures the security and isolation of each application in the SIM card. More specifically, in the given implementation the one or more Custom-Dedicated Files (custom-DFs) may lie in their corresponding available security domains and each third-party micro-service application from the one or more third party micro-service applications may be placed in a separate available security domain (i.e. in a custom-DF present in a separate available security domain), to provide an independent security control to said each third party micro-service application by one or more unique keys. Also, in the given implementation, the telecom and other mandated applets/applications may be placed in an entirely different available security domain than that of the one or more third party micro-service applications.

Further, the processing unit [202] is also configured to assign, an Application ID (AID) to each custom-DF of the one or more custom-DFs based on the telecom network operator's input. The SIM card must have at-least one Application ID (AID). In JAVA OS based SIM card, usually there are three AIDs viz. Package-ID, Applet-ID and Instance ID. An external device or host (i.e. the User Equipment (UE) or mobile handset/MODEM or manual interface) needs to SELECT (a command as per ISO-7816 standard) an appropriate AID or a logical name (of 16 bytes) which is assigned against a specific DF as entry point of an application. In an implementation there may be multiple DFs under a DF or inside a file system and all may not have assigned AIDS i.e. an AID is primarily assigned to entry point of any application or tree of a big file structure, therefore in an event once any specific AID against any specific DF as entry point of an application is selected, a boundary (access rights, protection, file operation, specific algorithm etc.) of said application is covered. Also, one or more mandatory applets in the SIM card are assigned against each DF or Dedicated File (i.e. $DF_{GSM}$, $DF_{TELECOM}$) and the other entities such as Master File (MF) or Elementary Files (EFs) are assigned with File Identifier (FID). Once an AID is selected, the host device/UE can access the files, data under a specific DF associated with such selected AID i.e. under a same application or applet. Also, READ and ACCESS conditions are very much defined by hierarchical logical position of DFs and EFs. As, the smart card/the SIM card may contain multiple applets, each applet is to be assigned with distinguishable AID. At any particular instance, the host system (i.e. the UE or user device) can access or operate any application area under a specific AID. Furthermore, the size of an AID is 16 Bytes where first 5 bytes are called RID (Registered application provider Identifier) and remaining 11 bytes are called PIX (Proprietary application Identifier extension). Usually, any organization/telecom network operator needs to obtain the RID by following prescribed registration process as approved by a National/Global authorized body. The PIX may be controlled at organization level as per multiple DFs or applets designation. Furthermore, as the processing unit [202] is configured to assign, the Application ID (AID) to each custom-DF of the one or more custom-DFs based on the telecom network operator's input, each custom-DF of the one or more custom-DFs contains its distinguished and designated AID (Application Identifier) which is assigned by the telecom network operator/MNO. The Application ID (AID) assigned to each custom-DF of the one or more custom-DFs further comprises the registered application provider Identifier (RID) and the Proprietary application Identifier extension (PIX), wherein the registered application provider Identifier (RID) is common for all Application IDs corresponding to all custom-DFs and the Proprietary application Identifier extension (PIX) is unique for each Application ID (AID) assigned to each custom-DF of the one or more custom-DFs. More specifically, the registered application provider Identifier (RID) for the one or more custom-DFs is same as obtained by the telecom network operator and the Proprietary application Identifier extension (PIX) is unique for said each custom-DF's AID. The PIX value is assigned based on the telecom network operator's input.

Also, the processing unit [202] is configured to assign, an Application Program Interface (API) to each custom-DF of the one or more custom-DFs, to enable provision of the one or more third party micro-service applications in said each custom-DF. In an implementation an API list defined to assign APIs may contain auto SMS sending, secure communication, personal or secure data storage etc. The list of API are telecom network operator specific and may vary with time based on respective SIM card OS functionality and other business cases including end-user requirements. Also, each custom-DF of the one or more custom-DFs is logically owned by the telecom network operator and may be offered to other third parties to port the one or more third party micro-applications/services after due validation. Also the offerings and availability of the one or more third party micro-applications/services for global or local coverage are fully governed by the telecom network operator with its own business plan.

Furthermore, each custom-DF of the one or more custom-DFs is independent of other custom-DFs of the one or more custom-DFs. There is no cross-communication between multiple custom-DFs including one or more DFs related to the pre-assigned memory (i.e. GSM/Telecom DFs). Furthermore, each custom-DF may contain a complete independent process flow with its own state diagram, wherein the process flow includes its logical operation(s) as well as memory operation(s) for storage of various internal and external (user) data. More specifically, in an implementation each individual custom-DF of the one or more custom-DFs is generic in nature and it contains its own file system and logical flow or application operation as per a client's need, to provide various value-added services which may be restricted by one or more rules and conditions and "offered API" by the telecom network operator. Also, the custom-DFs are not restricted to any specific type of application or applet.

Also, in an implementation the processing unit [202] is configured to execute two or more custom-DFs in parallel, wherein in an implementation such parallel execution/processing is independent of other custom DFs. The processing unit [202] is also configured to assign at least one of a computational power and a memory (RAM or storage Flash) to each custom-DF of the one or more custom-DFs based on the telecom network operator's input. In an implementation the computational power and the memory (RAM or storage Flash) may be assigned to said each custom-DF of the one or more custom-DFs before development/porting of the one or more third party micro-service applications in the one or more custom-DFs.

The processing unit [202] is further configured to enable, the SIM card as the micro-platform for the one or more third party micro-service applications based at least on the Application ID (AID) assigned to said each custom-DF of the one or more custom-DFs and the Application Program Interface (API) assigned to said each custom-DF of the one or more custom-DFs. Furthermore, in an implementation the enabling of the SIM card as the micro-platform for the one or more third party micro-service applications is also based on the above defined properties of the each custom-DF such as including but not limited to the complete independent process flow followed by the each custom-DF and the computational power and memory assigned to the each custom-DF.

Figure 4:
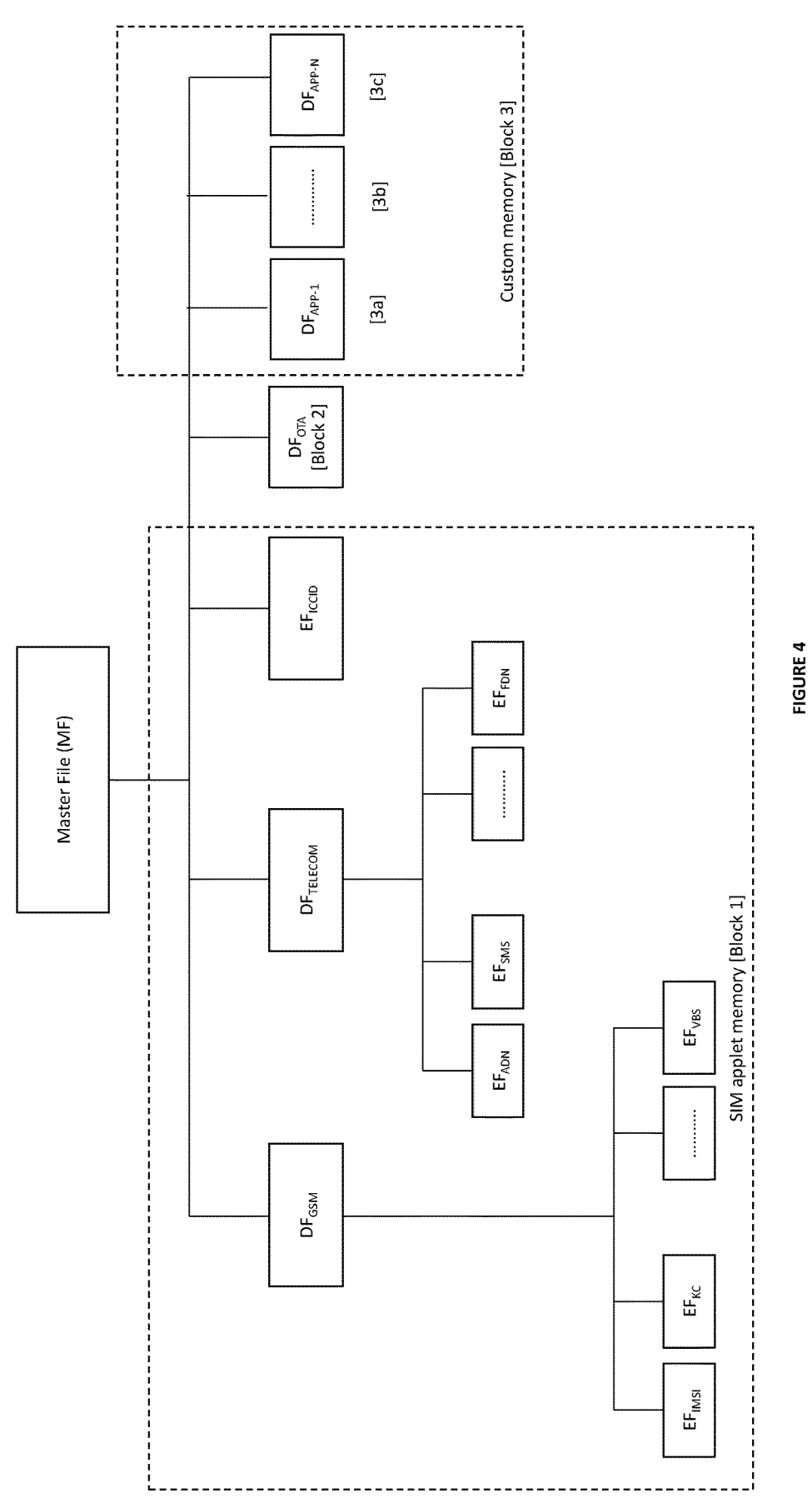
FIG. 4 illustrates an exemplary block diagram of a detailed file structure, a proposed memory map and logical partitions present in the proposed memory map of a SIM card, in accordance with exemplary embodiments of the present invention is shown.
Figure 5:
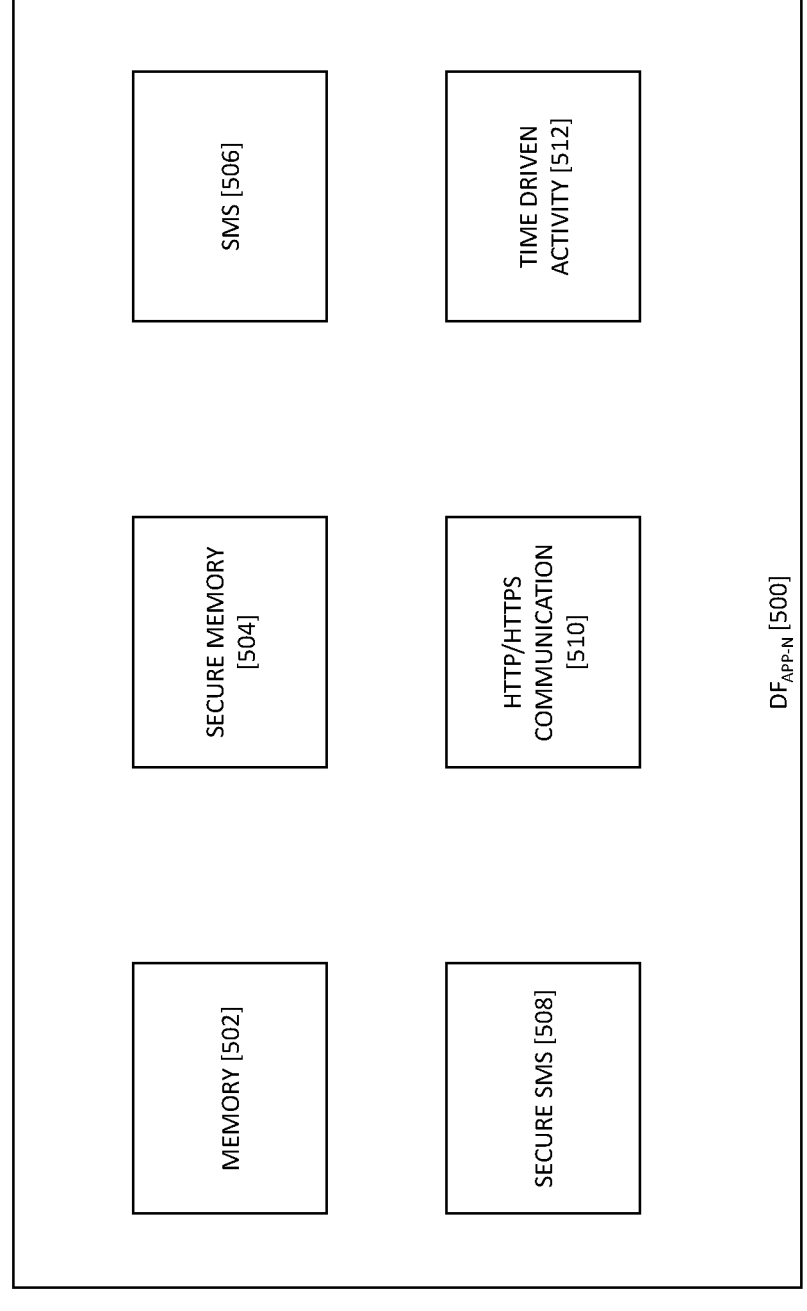
FIG. 5 illustrates exemplary elements under exemplary custom-DF, in accordance with exemplary embodiments of the present invention.

Furthermore, in FIG. 4 an exemplary block diagram of a detailed file structure, a proposed memory map and logical partitions present in the proposed memory map of a SIM card, in accordance with exemplary embodiments of the present invention is shown. The block 1 as indicated in the FIG. 4 is as per GSM specification and the block 3 indicates a custom memory added in the SIM card based on the implementation of the features of the present invention. FIG. 4 depicts that apart from mandatory DFs (i.e. DFTELE-COM, DFGSM) and their corresponding AIDS, the SIM card also contain multiple custom-DFs (i.e. 3a, 3b, 3c of Block 3) with their designated AIDs. Also, FIG. 4 depicts that the new custom-DFs defined under the custom memory i.e. 3a, 3b, 3c of Block 3 are designated as DFAPP-1, . . . , DFAPP-N. Furthermore, FIG. 4 also depicts that the Custom-DFs (i.e. block 3a, 3b, 3c) are residing in extra memory space apart from that of the GSM applet and the Telecom applet. Each individual custom-DF (DFAPP-1, DFAPP-2, DFAPP-3, . . . , DFAPP-N) contain its distinguished and designated AID (Application Identifier). Also said each custom-DF is generic in nature and contains its own file system and logical flow or application operation as per a client's choice, to provide various value-added services which may be restricted by rules and conditions and "offered API" by a network/telco service operator. The "offered API" indicates available features and functionalities in a base OS of the SIM card which is designed and owned by the telco service operator. Out of many custom and proprietary APIs, the telco service operator may provide all or limited functionalities to client or third party to use them for their custom applet(s) or micro-application(s). Furthermore, in an implementation, once a custom-DF from the one or more custom-DFs of the SIM card is selected to load a third party micro-service application, an internal architecture of a file system as well as of an operational flow of said custom-DF are free to be designed as per discretion of the client/third party in accordance with their need of value-added service. FIG. 5, depicts exemplary elements under exemplary custom-DF, in accordance with exemplary embodiments of the present invention. More specifically, the FIG. 5 indicates possible but not limited elements under the custom-DF including logical and physical memory blocks and other service level API which may be offered by the telecom network operator to the third party to develop/load its micro-application(s). Furthermore, the FIG. 5 indicates that said elements under a custom-DF (i.e. DFAPP-N) [500] may be a memory [502], a secure memory [504], an SMS [506], a secure SMS [508], a HTTP/HTTPs communication [510], a time driven activity [512] and the like. The custom-DF DFAPP-N is provided with certain Application Program Interfaces (APIs) to write third party micro-application(s) by the third party as per some of the indicated services in the FIG. 5. Also, the custom-DF DFAPP-N and/or each subsection of the custom-DF DFAPP-N may be used to store different value-added services and/or different third party micro-service applications. For a JAVA SIM card, a third party micro-application may be called as a third party micro-applet. However, the present disclosure covers all kind of SIM card OSs including JAVA or any other open/propitiatory OS.

Furthermore, in an implementation a number of custom-DFs in the custom memory and a size of each custom DF is defined by the SIM vendor/the telecom network operator considering various business propositions and values added services including requirement of end users and the one or more third party micro-applications. Also, in an implementation once the one or more custom-dedicated files are provided to the third party, the third party may opt a service coverage area either for all (National/International roaming) SIM cards as global coverage, or only for home-location based local coverage, as per requirements. The offerings and availability of the one or more third party micro-service applications for global or local coverage are fully governed by the telecom network operator with its own business plan.

Furthermore, any third party micro-application developed by any third party to provide any value-added service may benefited based on the implementation of the features of the present invention. Also, all third party micro-service applications needs suitable approval from the telecom network operator to port and utilize one or more value added service in a commercial space.

Furthermore, in order to enable provisioning of the one or more third party micro-service applications in the one or more custom-DFs, once the one or more third party micro-service applications are ready, the third party/the client needs to submit said one or more third party micro-service applications through a defined process to the telecom network operator. More particularly, as per the defined process firstly a system of compliance server of the telecom network operator is configured to receive from a third party server of the third party, the one or more third party micro-service applications, one or more test-cases related to the one or more third party micro-service applications and corresponding results of the one or more test-cases. In an implementation after appropriate business engagement and collaboration with the telecom network operator, the third party developer/client may develop the one or more third party micro-service applications/applets. Once the one or more third party micro-service applications are finalized, the third party/the client may transmit the one or more third party micro-service applications, test-case(s) with test result related to the one or more third party micro-service applications to the compliance server of the telecom network operator via the third party server. The third party server may also provide various other business clause related interaction mechanism such as financial payment, status update, access rules etc. The services related to third party server may be provided by remote internet connectivity with cloud server interface.

The compliance server is thereafter configured to upload, to a Micro-application Temporary Repository of the compliance server, the received one or more third party micro-service applications, the one or more test-cases related to the one or more third party micro-service applications and the corresponding results of the one or more test-cases. In an implementation, all data received by the third party server is stored in a buffer system named as the Micro-application Temporary Repository. The Micro-application Temporary Repository plays two roles viz. i) a data storage and ii) security buffer between the third party and the telecom network operator. Further, in an implementation the one or more third party micro-service applications may undergo multiple revisions. In such implementation, a change request before a final approval of the one or more third party micro-service applications, all intermediate changes in the one or more third party micro-service applications and one or more updates related to the one or more third party micro-service applications may be recorded and stored in the Micro-application Temporary Repository. The storage of the Micro-application Temporary Repository may be implemented over a local storage or a remote cloud storage based on security concerns of the telecom network operator.

Further, the compliance server is also configured to receive, from the third party server, a request for approval of the one or more third party micro-service applications. Once said request for approval is received, the compliance server is thereafter configured to perform, a complete compliance testing and a validation process for the approval of the one or more third party micro-service applications, based on the telecom network operator's input. Also, the compliance server is further configured to approve, the one or more third party micro-service applications based on a successful complete compliance testing and a successful validation process. More particularly, based on the request for approval of the one or more third party micro-service applications, the one or more third party micro-service applications go through a complete compliance testing and validation process to ensure acceptable performance (such as dead-lock, memory consumption, CPU consumption etc.) and security requirements (such as file access, unauthorized data transmission or inception etc.). The compliance testing may be performed by a complete authority of the telecom network operator which may mandate a white-box testing or other suitable testing parameters to ensure non-violation of the one or more third party micro-application as per operational requirement. The roles, accountability and engagement of the client/third party/micro-application developer in the compliance testing process is the discretion of the telecom network operator. Also, in an implementation the approval process may involve multiple iterations of submission of the one or more third party micro-service applications, testing and re-testing. The required effort and financial are to be managed by the telecom network operator's business policy. Also, an outcome of the compliance testing may be indicated at the third party portal. The approval of the one or more third party micro-service applications may not be completed until the one or more third party micro-service applications passes all conditions of the telecom network operator requirements. Once the one or more third party micro-service applications meets all conditions of compliance testing, the client/the third party may trigger for next step (i.e. to transfer of approved applet to a Final repository) through the third party server.

After approving the one or more third party micro-service applications based on the successful complete compliance testing and the successful validation process, the compliance server is configured to transfer, from the Micro-application Temporary Repository to the Final repository of the compliance server, the one or more third party micro-service applications with an encryption mechanism. The one or more third party micro-service applications are transferred to the Final repository with the encryption mechanism based on the approval of the one or more third party micro-service applications. Furthermore, in an implementation after the verification and compliance testing, on request of the client/ the third party developer, the approved one or more third party micro-service applications are transferred to the Final repository with an appropriate strong encryption mechanism (such as encryption algorithms like AES-256 or RSA-2048 or ECC-256 bit or higher) to maintain necessary data integrity (such as SHA-2, 512 bit or higher). The exact acceptance and adoption of data security and integrity algorithms are under discretion of the telecom network operator.

Also, the compliance server is further configured to receive, from the third party server, a request to load the one or more third party micro-service applications from the Final repository to the one or more custom-DFs as per a coverage area. Thereafter, the compliance server is configured to transmit, from the Final repository via an OTA server, the one or more third party micro-service applications to the one or more custom-DFs based on the receipt of the request to load. For instance, in an implementation, via the third party server, the client/third party may indicate consent and request to load one or more approved third party micro-service applications to a SIM card as per a coverage area. Once said request is received, said one or more approved third party micro-service applications may be queued to the OTA server and transferred to the targeted SIM card in next available time-slots as per business rules of the telecom network operator.

Furthermore, in an implementation the user device on which the SIM card is installed may interact with the SIM card to execute/run the one or more third party micro-service applications loaded on the SIM card. In order to provide such interaction between the user device and the SIM card, the processing unit [202] is configured to initialize, the SIM card at the user device/UE, wherein a network registration of the UE with the telecom network operator's network is identified at the UE based on the initialization of the SIM card at the UE. The network registration is identified to access at the UE, a desired third party micro-service application from the one or more third party micro-service applications present in the one or more custom-DFs of the SIM card.

More particularly, after starting the UE, the SIM card is initialised at the UE and the UE thereafter tries for registering itself to its respective mobile network operator's network (MNO's network). The one or more third party micro-service applications present in the one or more custom-DFs of the SIM card may work with or without the network registration of the UE, based on the MNO's discretion. If the network registration is mandatory for the UE, an access to the one or more third party micro-service applications present in the one or more custom-DFs of the SIM card is denied in absence of the network registration. In an implementation this process may be pre-defined and declared by the MNO, hence a direct decision may be taken by the UE either to interact with the one or more third party micro-service applications present in the one or more custom-DFs of the SIM card or not, without actually sending any command or request to the SIM card from a UE application.

Further, once the access to the one or more third party micro-service applications present in the one or more custom-DFs of the SIM card is granted to the UE, there may be two mechanisms followed by the UE to select any specific or desired third party micro-service application from the one or more third party micro-service applications present in the one or more custom-DFs of the SIM card. The UE may get from the SIM card all available third party micro-service application's AID list then send "SELECT" command to the desired third party micro-service application as intended. Alternatively, if the AID of the desired third party micro-service application is known, the UE may directly send "SELECT" query to initiate said desired third party micro-service application. In absence of the AID of the desired third party micro-service application, an error code may be returned. Once the desired third party micro-service application is selected, a process inside said desired third party micro-service application may be executed at the UE. The behaviour and boundary of the operation of the desired third party micro-service application is fully under the discretion of the MNO and the applet developer (i.e. the third party), which may contain various internal states viz. Finite Process, Infinite Process, Pause/Resume Process, Terminate Process, Get Response etc. Also, against each query or command from the UE to the desired third party micro-service application, an output (such as a response data, error, status etc.) is sent back to the UE by the processing unit, which can be further processed as per independent design and architecture of the UE's host application.

In another embodiment, physical placement of any single/multiple system/server at any block/sub-block is very much operation/implementation specific and may vary as per deployment strategy.

Referring to FIG. 6 an exemplary method flow diagram [600], for enabling a SIM card as a micro-platform for one or more third party micro-service applications, in accordance with exemplary embodiments of the present invention is shown. In an implementation the method is performed by the system [200]. Further, in an implementation, the system [200] may be present in a SIM card to implement the features of the present invention. Also, as shown in FIG. 6, the method starts at step [602].

At step [604] the method comprises adding, by a processing unit, a custom memory in the SIM card based on a telecom network operator's input. The SIM card also comprises a pre-assigned memory, wherein the pre-assigned memory is a memory segment defined as per specific guidelines/regulations for GSM and/or Telecom applet(s). The method encompasses adding the custom memory in the SIM card in addition to the memory block/segment governed by the standard (i.e. in addition to the pre-assigned memory), therefore the custom memory is an extra memory space apart from the memory space assigned for the GSM and/or Telecom applet(s).

Next at step [606] the method comprises partitioning, by the processing unit [202], the custom memory of the SIM card into one or more Custom-Dedicated Files (custom-DFs), wherein the one or more custom-DFs are provided with an operating system support from the telecom network operator. In an implementation the partitioning of the custom memory of the SIM card into the one or more custom-DFs is based on at least one of one or more logical and one or more access partition techniques. Also, in another implementation the method encompasses partitioning by the processing unit, the custom memory of the SIM card in the one or more Custom-Dedicated Files (custom-DFs) based on one or more available security domains. The one or more available security domains may be defined by a Global-Platform. The Global-Platform (GP) is an independent and non-profit organization that deals with smart card development and it's management. The Global-Platform (GP) has introduced a specific way of managing the security of each application within the SIM card. This way it ensures the security and isolation of each application in the SIM card. More specifically, in the given implementation the one or more Custom-Dedicated Files (custom-DFs) may lie in their corresponding available security domains and each third party micro-service application from the one or more third party micro-service applications may be placed in a separate available security domain (i.e. in a custom-DF present in a separate available security domain), to provide an independent security control to said each third party micro-service application by one or more unique keys. Also, in the given implementation the telecom and other mandated applets/applications may be placed in an entirely different available security domain than that of the one or more third party micro-service applications.

Further, at step [608] the method comprises assigning, by the processing unit [202], an Application ID (AID) to each custom-DF of the one or more custom-DFs based on the telecom network operator's input. Each custom-DF of the one or more custom-DFs therefore contains its distinguished and designated AID (Application Identifier) which is assigned by the telecom network operator/MNO. The Application ID (AID) assigned to each custom-DF of the one or more custom-DFs further comprises a registered application provider Identifier (RID) and a Proprietary application Identifier extension (PIX), wherein the registered application provider Identifier (RID) is common for all Application IDs corresponding to all custom-DFs and the Proprietary application Identifier extension (PIX) is unique for each Application ID (AID) assigned to each custom-DF of the one or more custom-DFs. More specifically, the registered application provider Identifier (RID) for the one or more custom-DFs is same as obtained by the telecom network operator and the Proprietary application Identifier extension (PIX) is unique for said each custom-DF's AID. The PIX value is assigned based on the telecom network operator's input Next, at step [610] the method comprises assigning, by the processing unit [202], an Application Program Interface (API) to each custom-DF of the one or more custom-DFs, to enable provision of the one or more third party micro-service applications in said each custom-DF. In an implementation, the method encompasses defining by the processing unit [202], an API list to assign APIs, wherein the API list may contain auto SMS sending, secure communication, personal or secure data storage etc. The list of API are telecom network operator specific and may vary with time to time based on respective SIM card OS functionality and other business cases including end-user requirements. Also, each custom-DF of the one or more custom-DFs is logically owned by the telecom network operator and may be offered to other third parties to port the one or more third party micro-applications/services after due validation. Also the offerings and availability of the one or more third party micro-applications/services for global or local coverage are fully governed by the telecom network operator with its own business plan.

Furthermore, each custom-DF of the one or more custom-DFs is independent of other custom-DFs of the one or more custom-DFs. There is no cross-communication between multiple custom-DFs including one or more DFs related to the pre-assigned memory (i.e. GSM/Telecom DFs). Furthermore, each custom-DF may contain a complete independent process flow with its own state diagram, wherein the process flow includes its logical operation(s) as well as memory operation(s) for storage of various internal and external (user) data. More specifically, in an implementation each individual custom-DF of the one or more custom-DFs is generic in nature and it contains its own file system and logical flow or application operation as per a client's need, to provide various value-added services which may be restricted by one or more rules and conditions and "offered API" by the telecom network operator. Also, the custom-DFs are not restricted to any specific type of application or applet.

In an implementation the method also comprises executing by the processing unit [202] two or more custom-DFs in parallel, wherein in an implementation such parallel execution/processing is independent of other custom DFs. The method also encompasses assigning by the processing unit, at least one of a computational power and a memory to each custom-DF of the one or more custom-DFs based on the telecom network operator's input. In an instance, the computational power and the memory (RAM or storage Flash) may be assigned to the each custom-DF of the one or more custom-DFs before development/porting of the one or more third party micro-service applications in the one or more custom-DFs.

Thereafter, at step [612] the method comprises enabling, by the processing unit, the SIM card as the micro-platform for the one or more third party micro-service applications based on the Application ID (AID) assigned to said each custom-DF of the one or more custom-DFs and the Application Program Interface (API) assigned to said each custom-DF of the one or more custom-DFs. Furthermore, in an implementation the enabling of the SIM card as the micro-platform for the one or more third party micro-service applications is also based on the above defined properties of the each custom-DF such as including but not limited to the complete independent process flow followed by the each custom-DF and the computational power and memory assigned to the each custom-DF.

Further, in FIG. 7 an exemplary proposed memory map of a SIM card [710] installed in a user device [702], in accordance with exemplary embodiments of the present invention is shown. More specifically, FIG. 7 indicates various unit of the user device [702] i.e. a radio hardware [702 a], a radio interface layer [702 b], an operating system [702 c], a user application [702 d] and various units of the SIM card [710] i.e. a SIM applet memory [704], a custom memory [706] and an OTA service [708]. The FIG. 7 also depicts various memory maps based on the partition of the custom memory [706] in accordance with the implementation of the features of the present invention. In FIG. 7 it is indicated that the custom memory [706] is partitioned in custom memory map 1 [706 a], custom memory map 2 [706 b], custom memory map N [706 N], i.e. the custom memory map 1 [706 a], the custom memory map 2 [706 b], the custom memory map N [706 N] indicates various custom-DFs.

Furthermore, in order to enable provisioning of the one or more third party micro-service applications in the one or more custom-DFs, once the one or more third party micro-service applications are ready, the third party/the client needs to submit said one or more third party micro-service applications through a defined process to the telecom network operator. Therefore, as per said defined process the method also comprises receiving, at a compliance server of the telecom network operator from a third party server, the one or more third party micro-service applications, one or more test-cases related to the one or more third party micro-service applications and corresponding results of the one or more test-cases. In an implementation after appropriate business engagement and collaboration with the telecom network operator, the third party developer/client may develop the one or more third party micro-service applications/applets. Once the one or more third party micro-service applications are finalized by the third party, the method may comprise receiving at the compliance server of the telecom network operator from the third party server, the one or more third party micro-service applications, the test-case(s) with test result related to the one or more third party micro-service applications. The third party server may also provide various other business clause related interaction mechanism such as financial payment, status update, access rules etc. The services related to third party server may be provided by remote internet connectivity with cloud server interface.

The method further comprises uploading, by the compliance server to a Micro-application Temporary Repository of the compliance server, the received one or more third party micro-service applications, the one or more test-cases related to the one or more third party micro-service applications and the corresponding results of the one or more test-cases. In an implementation, all data received by the third party server is stored in the Micro-application Temporary Repository. The Micro-application Temporary Repository plays two roles viz. i) a data storage and ii) security buffer between the third party and the telecom network operator. Further, in an implementation the one or more third party micro-service applications may undergo multiple revisions. In such implementation, a change request before a final approval of the one or more third party micro-service applications, all intermediate changes in the one or more third party micro-service applications and one or more updates related to the one or more third party micro-service applications may be recorded and stored in the Micro-application Temporary Repository. The storage of the Micro-application Temporary Repository may be implemented over a local storage or a remote cloud storage based on security concerns of the telecom network operator.

The method thereafter comprises receiving, at the compliance server from the third party server, a request for approval of the one or more third party micro-service applications. Once said request for approval is received, the method thereafter comprises performing, by the compliance server, a complete compliance testing and a validation process for the approval of the one or more third party micro-service applications, based on the telecom network operator's input. Thereafter, the method comprises approving, by the compliance server, the one or more third party micro-service applications based on a successful complete compliance testing and a successful validation process. More particularly, based on the request for approval of the one or more third party micro-service applications, the one or more third party micro-service applications go through a complete compliance testing and validation process to ensure acceptable performance (such as dead-lock, memory consumption, CPU consumption etc.) and security requirements (such as file access, unauthorized data transmission or inception etc.). The compliance testing may be performed by a complete authority of the telecom network operator which may mandate a white-box testing or other suitable testing parameters to ensure non-violation of the one or more third party micro-application as per operational requirement. The roles, accountability and engagement of the client/third party/micro-application developer in the compliance testing process is the discretion of the telecom network operator. Also, in an implementation the approval process may involve multiple iterations of submission of the one or more third party micro-service applications, testing and re-testing. The required effort and financial are to be managed by the telecom network operator's business policy. Also, the method may encompasses providing by the compliance server, an outcome of the compliance testing at the third party portal. The approval of the one or more third party micro-service applications may not be completed until the one or more third party micro-service applications passes all conditions of the telecom network operator requirements. Once the one or more third party micro-service applications meets all conditions of compliance testing, the client/the third party may trigger transferring of the one or more approved third party applet(s)/application(s) to a Final repository.

After approving the one or more third party micro-service applications based on the successful complete compliance testing and the successful validation process, the method comprises transferring, by the compliance server from the Micro-application Temporary Repository to the Final repository of the compliance server, the one or more third party micro-service applications with an encryption mechanism. The one or more third party micro-service applications are transferred to the Final repository with the encryption mechanism based on the approval of the one or more third party micro-service applications. Furthermore, in an implementation after the verification and compliance testing, on receipt of a request of the client/the third party developer, the approved one or more third party micro-service applications are transferred to the Final repository with an appropriate strong encryption mechanism (such as encryption algorithms like AES-256 or RSA-2048 or ECC-256 bit or higher) to maintain necessary data integrity (such as SHA-2, 512 bit or higher). The exact acceptance and adoption of data security and integrity algorithms are under discretion of the telecom network operator.

The method also comprises receiving, at the compliance server from the third party server, a request to load the one or more third party micro-service applications from the Final repository to the one or more custom-DFs as per a coverage area. Thereafter, the method comprises transmitting, by the compliance server from the Final repository via an OTA server, the one or more third party micro-service applications to the one or more custom-DFs based on the receipt of the request to load. For instance, in an implementation, if a request to load one or more approved third party micro-service applications to a SIM card as per a coverage area is received, the method encompasses queuing said one or more approved third party micro-service applications to the OTA server for transferring them to the targeted SIM card in next available time-slots as per business rules of the telecom network operator.

Furthermore, in an implementation the user device/UE on which the SIM card is installed may interact with the SIM card to execute/run the one or more third party micro-service applications loaded on the SIM card. In order to provide such interaction between the UE and the SIM card, the method comprises initializing by the processing unit, the SIM card at the UE, wherein a network registration of the UE with the telecom network operator's network is identified at the UE based on the initialization of the SIM card at the UE. The network registration is identified to access at the UE, a desired third party micro-service application from the one or more third party micro-service applications present in the one or more custom-DFs of the SIM card. Furthermore, FIGS. 8 (8a and 8b) illustrates an exemplary interaction between a UE and a SIM card, in accordance with exemplary embodiments of the present invention. The process indicated in the FIG. 8 starts at [802]. Further at [804], the UE is started/powered on and next at [806] the SIM card is initialized on the UE. Therefore FIG. 8 depicts that after starting the UE, the SIM card is initialised at the UE and the UE thereafter tries for registering itself to its respective mobile network operator's network (MNO's network) at [808]. In an implementation, one or more third party micro-service applications present in one or more custom-DFs of the SIM card may work with or without the network registration of the UE, based on the telecom network operator's/MNO's discretion. If the network registration is mandatory for the UE, an access to the one or more third party micro-service applications present in the one or more custom-DFs of the SIM card is denied in absence of the network registration. Therefore FIG. 8, at [810] depicts a step of identifying if the UE is registered to the network. In an event of a positive response an access to the one or more third party micro-service applications present in the one or more custom-DFs is granted at the UE at step [816], otherwise the process leads to step [812] or to step [808] to retry network registration at [808]. At step [812] it is identified if the access to the one or more third party micro-service applications present in the one or more custom-DFs can be granted at the UE without registration of the UE on its network. In an event of positive response the process leads to step [816], otherwise the process leads to step [814] where the access to the one or more third party micro-service applications present in the one or more custom-DFs is denied at the UE. In an implementation the process to provide access to the one or more third party micro-service applications present in the one or more custom-DFs, at the UE, with or without requirement of registration of the UE on its network may be pre-defined and declared by the MNO. Hence, in such implementation a direct decision may be taken by the UE either to interact with the one or more third party micro-service applications present in the one or more custom-DFs of the SIM card or not, without actually sending any command or request to the SIM card from a UE application.

Further, once the access to the one or more third party micro-service applications present in the one or more custom-DFs of the SIM card is granted to the UE, there may be two mechanisms followed by the UE to select any specific or desired third party micro-service application from the one or more third party micro-service applications present in the one or more custom-DFs of the SIM card. The UE may request the SIM card for all available third party micro-service application's AID list (as indicated at [824]) and based on such request for the list of the AIDS, the SIM card may send all available third party micro-service application's AID list to the UE (as indicated at [826]). Thereafter, at [828] the UE may send "SELECT" command to the desired third party micro-service application as intended and at step [830] the desired third party micro-service application may be selected. Alternatively, if the AID of the desired third party micro-service application is known, the UE may request access for the desired third party micro-service application (as indicated at [818]). More specifically, at [818], the UE may directly send "SELECT" query to initiate said desired third party micro-service application. Further at step [820] it is identified if AID corresponding to the user's "SELECT" query is available or not, in an event of the positive response the process leads to step [830] otherwise the process leads to step [822]. In absence of the AID of the desired third party micro-service application, at [822] an error code may be returned at the UE. Once the desired third party micro-service application is selected at [830], at [832] a process inside said desired third party micro-service application may be executed at the UE. The behaviour and boundary of the operation of the desired third party micro-service application is fully under the discretion of the MNO and the applet developer (i.e. the third party), which may contain various internal states viz. Finite Process, Infinite Process, Pause/Resume Process, Terminate Process, Get Response etc. Also, against each query or command from the UE to the desired third party micro-service application, an output (such as a response data, error, status etc.) is sent back to the UE by the SIM card (as indicated at step [834]), which can be further processed as per independent design and architecture of the UE's host application. The process further terminates at step [836].

Also, after successfully enabling the SIM card as the micro-platform for the one or more third party micro-service applications, the method [600] terminates at step [614].

Furthermore, an aspect of the present invention relates to a SIM card provided as a micro-platform for one or more third party micro-service applications, wherein the SIM card comprises at least a pre-assigned memory segment and a custom memory segment. The pre-assigned memory segment is a memory segment defined as per specific guidelines/regulations and the pre-assigned memory segment is assigned for GSM and/or Telecom applet(s). The custom memory segment is an additional memory segment and is configured to store a data related to one or more third party micro-service applications.

As is evident from the above disclosure, the present invention provides a novel solution for enabling a SIM card as a micro-platform for one or more third party micro-service applications. More particularly, the present invention provides a novel solution that helps a service provider/telecom network operator to provide via a SIM card, value added services to users either by itself or through other third parties. Also, the present invention provides a novel solution for logical and access partition(s) in a SIM memory, running secured application(s) on the SIM itself without waking the user device/UE operating system (OS), partitioning a SIM memory to store secured application(s) with secured element(s) and also for providing the SIM as service with parallel processing etc. The present invention also provides a technical advancement over the currently known solutions by overcoming the limitation of prior known solutions related to at least one of: a failure of providing a logical and access partition in a SIM memory to accommodate independent micro-application(s) or applet(s), a failure of running secured applications on a SIM card itself without waking the user device/UE OS, a failure of using a capability of a SIM card to provide enhanced communication security feature(s), a failure of enabling a SIM card to provide a secure area for secure operation(s), a failure of providing parallel processing by utilizing a SIM hardware to enhance a processing capability etc.

Further, the systems/units depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home/building and may include network devices located outside of the user's home/building. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for enabling a SIM card as a micro-platform for one or more third party micro-service applications, the method comprising:

adding, by a processing unit, a custom memory in the SIM card based on a telecom network operator's input;

partitioning, by the processing unit, the custom memory of the SIM card into one or more Custom-Dedicated Files (custom-DFs), wherein the one or more custom-DFs are provided with an operating system support from the telecom network operator;

assigning, by the processing unit, an Application ID (AID) to each custom-DF of the one or more custom-DFs based on the telecom network operator's input;

assigning, by the processing unit, an Application Program Interface (API) to each custom-DF of the one or more custom-DFs, to enable provision of the one or more third party micro-service applications in said each custom-DF; and enabling, by the processing unit, the SIM card as the micro-platform for the one or more third party micro-service applications based on the Application ID (AID) assigned to said each custom-DF and the Application Program Interface (API) assigned to said each custom-DF.

2. The method as claimed in claim 1, wherein partitioning of the custom memory of the SIM card into the one or more custom-DFs is based on at least one of one or more logical and one or more access partition techniques.

3. The method as claimed in claim 1, wherein the SIM card further comprises a pre-assigned memory.

4. The method as claimed in claim 1, wherein each custom-DF of the one or more custom-DFs is independent of other custom-DFs of the one or more custom-DFs.

5. The method as claimed in claim 1, wherein at least one of a computational power and a memory is assigned to each custom-DF of the one or more custom-DFs based on the telecom network operator's input.

6. The method as claimed in claim 1, the method further comprises executing two or more custom-DFs in parallel.

7. The method as claimed in claim 1, wherein the Application ID (AID) assigned to each custom-DF of the one or more custom-DFs further comprises a registered application provider Identifier (RID) and a Proprietary application Identifier extension (PIX), wherein the registered application provider Identifier (RID) is common for all Application IDs corresponding to all custom-DFs and the Proprietary application Identifier extension (PIX) is unique for each Application ID (AID) assigned to each custom-DF of the one or more custom-DFs.

8. The method as claimed in claim 1, wherein the partitioning, by the processing unit, the custom memory of the SIM card in one or more Custom-Dedicated Files (custom-DFs) is further based on one or more available security domains.

9. The method as claimed in claim 8, wherein each third party micro-service application from the one or more third party micro-service applications is placed in a separate available security domain to provide an independent security control by one or more unique keys.

10. A system for enabling a SIM card as a micro-platform for one or more third party micro-service applications, the system comprising:

a processing unit, configured to:

add, a custom memory in the SIM card based on a telecom network operator's input, partition, the custom memory of the SIM card into one or more Custom-Dedicated Files (custom-DFs), wherein the one or more custom-DFs are provided with an operating system support from the telecom network operator, assign, an Application ID (AID) to each custom-DF of the one or more custom-DFs based on the telecom network operator's input, assign, an Application Program Interface (API) to each custom-DF of the one or more custom-DFs, to enable provision of the one or more third party micro-service applications in said each custom-DF, and enable, the SIM card as the micro-platform for the one or more third party micro-service applications based on the Application ID (AID) assigned to said each custom-DF and the Application Program Interface (API) assigned to said each custom-DF.

11. The system as claimed in claim 10, wherein the processing unit [202] is further configured to partition the custom memory of the SIM card into the one or more custom-DFs based on at least one of one or more logical and one or more access partition techniques.

12. The system as claimed in claim 10, wherein the SIM card further comprises a pre-assigned memory.

13. The system as claimed in claim 10, wherein each custom-DF of the one or more custom-DFs is independent of other custom-DFs of the one or more custom-DFs.

14. The system as claimed in claim 10, wherein processing unit [202] is further configured to assign at least one of a computational power and a memory to each custom-DF of the one or more custom-DFs based on the telecom network operator's input.

15. The system as claimed in claim 10, wherein processing unit [202] is further configured to execute two or more custom-DFs in parallel.

16. The system as claimed in claim 10, wherein the Application ID (AID) assigned to each custom-DF of the one or more custom-DFs further comprises a registered application provider Identifier (RID) and a Proprietary application Identifier extension (PIX), wherein the registered application provider Identifier (RID) is common for all Application IDs corresponding to all custom-DFs and the Proprietary application Identifier extension (PIX) is unique for each Application ID (AID) assigned to each custom-DF of the one or more custom-DFs.

17. The system as claimed in claim 10, wherein the processing unit [202] is further configured to partition the custom memory of the SIM card in the one or more Custom-Dedicated Files (custom-DFs) based on one or more available security domains.

18. The system as claimed in claim 17, wherein each third party micro-service application from the one or more third party micro-service applications is placed in a separate available security domain to provide an independent security control by one or more unique keys.

19. A SIM card as a micro-platform for one or more third party micro-service applications, the SIM card comprising:

a pre-assigned memory segment, wherein:
  the pre-assigned memory segment is a memory seg-
    ment defined as per specific guidelines, and
  the pre-assigned memory segment is assigned for one
    or more telecom applets; and
a custom memory segment, wherein:
  the custom memory segment is an additional memory
    segment, and
  the custom memory segment is configured to store a
    data related to the one or more third party micro-
    service applications.

\* \* \* \* \*